United States Patent
Howe et al.

(10) Patent No.: US 8,206,080 B2
(45) Date of Patent: Jun. 26, 2012

(54) GAS TURBINE ENGINE WITH IMPROVED THERMAL ISOLATION

(75) Inventors: Jeff Howe, Chandler, AZ (US); Mark C. Morris, Phoenix, AZ (US); Khosro Molla Hosseini, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1186 days.

(21) Appl. No.: 12/138,108

(22) Filed: Jun. 12, 2008

(65) Prior Publication Data

US 2009/0317244 A1    Dec. 24, 2009

(51) Int. Cl.
*F01D 25/00* (2006.01)
(52) U.S. Cl. ............... 415/58.4; 415/177; 415/199.5
(58) Field of Classification Search ........... 415/58.4, 415/58.7, 59.1, 177, 199.5
See application file for complete search history.

(56) References Cited

U.S. PATENT DOCUMENTS

| | | | |
|---|---|---|---|
| 4,190,397 A | 2/1980 | Schilling et al. | |
| 4,320,903 A | 3/1982 | Ayache et al. | |
| 5,215,435 A | 6/1993 | Webb et al. | |
| 5,224,822 A * | 7/1993 | Lenahan et al. | 415/189 |
| 5,252,026 A | 10/1993 | Shepherd | |
| 5,380,150 A | 1/1995 | Stahl | |
| 5,399,066 A * | 3/1995 | Ritchie et al. | 415/115 |
| 5,545,004 A * | 8/1996 | Ho et al. | 415/115 |
| 5,597,286 A | 1/1997 | Dawson et al. | |
| 5,630,703 A | 5/1997 | Hendley et al. | |
| 6,431,820 B1 | 8/2002 | Beacock et al. | |
| 6,481,959 B1 * | 11/2002 | Morris et al. | 415/115 |
| 6,551,056 B2 | 4/2003 | Rau | |
| 6,960,060 B2 | 11/2005 | Lee | |
| 7,025,562 B2 | 4/2006 | Imbourg et al. | |
| 7,037,067 B2 | 5/2006 | Okita et al. | |
| 7,094,020 B2 | 8/2006 | Dong et al. | |
| 7,137,777 B2 | 11/2006 | Fried et al. | |
| 7,229,247 B2 | 6/2007 | Durocher et al. | |
| 7,249,463 B2 | 7/2007 | Anderson et al. | |
| 7,341,429 B2 | 3/2008 | Montgomery et al. | |
| 2005/0053460 A1 | 3/2005 | Czachor et al. | |
| 2007/0025836 A1 | 2/2007 | Nichols et al. | |
| 2007/0059158 A1 | 3/2007 | Alvanos et al. | |
| 2010/0119364 A1 * | 5/2010 | Bunker | 415/199.5 |

* cited by examiner

*Primary Examiner* — Stephen W Smoot
(74) *Attorney, Agent, or Firm* — Ingrassia Fisher & Lorenz, P.C.

(57) ABSTRACT

A gas turbine engine includes a housing with a duct wall that defines a generally annular and axially elongated hot gas flow path for passage of combustion gas. The engine further includes a contoured shroud mounted within the internal engine cavity and defining a hot gas recirculation pocket for receiving hot gas ingested from the hot gas flow path through the annular space and for recirculating the ingested hot gas back through the annular space to the hot gas flow path. The contoured shroud includes a base wall extending radially inwardly from the duct wall, an inboard wall extending from the base wall in an axial direction toward the rotor, and an end wall extending from the inboard wall in a radially outward direction. The end wall terminates in a circumferentially extending free edge disposed in proximity to the annular space. The end wall defines an opening.

20 Claims, 5 Drawing Sheets

GAS TURBINE ENGINE WITH IMPROVED THERMAL ISOLATION

TECHNICAL FIELD

The present invention generally relates to gas turbine engines, and more particularly relates to gas turbine engines with improved thermal isolation of engine components from high temperature mainstream combustor gases.

BACKGROUND

Gas turbine engines are generally known in the art and used in a wide range of applications, such as aircraft engines and auxiliary power units for aircraft. In a typical configuration, the turbine of such engines includes rows of stator vanes and rotor blades disposed in an alternating sequence along the axial length of a generally annular hot gas flow path. The rotor blades are mounted at the periphery of one or more rotor disks which are coupled in turn to a main engine shaft. Hot combustion gases are delivered from an engine combustor to the annular hot gas flow path, thus resulting in rotary driving of the rotor disks to provide an engine output.

In most gas turbine engine applications, it is desirable to regulate the operating temperature of certain engine components in order to prevent overheating and potential mechanical failures attributable thereto. That is, while the engine stator vanes and rotor blades are specially designed to function in the high temperature environment of the mainstream hot gas flow path, other engine components such as the rotor disks must also be designed to withstand the high temperatures of their respective environments. Accordingly, in many gas turbine engines the volumetric space disposed radially inwardly or internally from the hot gas flow path includes an internal engine cavity through which a cooling air flow is provided. The cooling air flow is normally obtained as a bleed flow from a compressor or compressor stage forming a portion of the gas turbine engine. The cooling of the internal engine cavity attempts to maintain temperatures of the rotor disks and other internal engine components that are suitable for their material and stress level.

In many conventional engines, relatively high cooling air flows have been used to obtain satisfactory temperature control of engine components within the cooled internal engine cavity. The demand for cooling flow has been impacted by an irregular and unpredictable ingestion of mainstream hot gases from the hot gas flow path into the internal engine cavity. Various attempts to prevent flow between adjacent stator vanes and rotor blades have primarily involved the use of overlapping lip-type structures in close running clearance, often referred to as flow discouragers, but these structures have not been satisfactorily effective in preventing hot gas ingestion.

A variety of baffle-type structures and techniques have been proposed, in addition to the traditional flow discouragers, in effort to minimize hot gas ingestion into the internally cooled cavity of gas turbine engines. Such approaches have included pockets with complex shape, some of which receive separate flows of cooling gas, to prevent hot gas ingestion. In the past, these techniques may have been generally ineffective, or have otherwise required structures of complex shape and/or mounting arrangements at the time of initial engine production.

Accordingly, it is desirable to provide an improved gas turbine engine that reduces or eliminates the effects of hot gas ingestion. In addition, it is desirable to provide a recirculation pocket that captures and recirculates ingested hot gas with high efficiency, while additionally being configured for quick and easy installation during engine production. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, a gas turbine engine is provided. The engine includes a housing including a duct wall and defining a generally annular and axially elongated hot gas flow path for passage of combustion gas. The duct wall separates the hot gas flow path from an internal engine cavity, and the duct wall has at least one annular space. The engine further includes a rotor rotatably mounted on an engine shaft for transferring energy from the combustion gas in the hot gas flow path to the engine shaft. The rotor extends from the internal engine cavity, through the annular space of the duct wall, and into the hot flow path. The engine further includes a contoured shroud mounted within the internal engine cavity and defining a hot gas recirculation pocket for receiving hot gas ingested from the hot gas flow path through the annular space and for recirculating the ingested hot gas back through the annular space to the hot gas flow path. The contoured shroud includes a base wall extending radially inwardly from the duct wall, an inboard wall extending from the base wall in an axial direction toward the rotor, and an end wall extending from the inboard wall in a radially outward direction. The end wall terminates in a circumferentially extending free edge disposed in proximity to the annular space. The end wall defines an opening.

In accordance with another exemplary embodiment, a gas turbine is provided. The gas turbine includes a housing including a duct wall and defining a generally annular and axially elongated hot gas flow path for passage of combustion gas. The duct wall separates the hot gas flow path from an internal engine cavity, and the duct has at least one annular space. A circumferentially extending row of stator vanes is mounted on the housing within the hot gas flow path at a position generally at the upstream side of the annular space in the duct wall relative to the direction of combustion gas flow through the hot gas flow path. A turbine rotor includes a rotor disk rotatably supported within the internal engine cavity with a periphery of the rotor disk disposed generally within the annular space formed in the duct wall, and a plurality of rotor blades on the disk periphery and disposed generally within the hot gas flow path. A contoured shroud is mounted within the internal engine cavity in close running clearance with the rotor disk at the disk periphery. The shroud defines a radially outwardly open and circumferentially extending hot gas recirculation pocket for receiving hot gas ingested from the hot gas flow path through the annular space and for recirculating the ingested hot gas back through the annular space to the hot gas flow path. The contoured shroud additionally defines an attachment access opening.

In accordance with yet another exemplary embodiment, a gas turbine engine includes a housing having a duct wall and defining a generally annular and axially elongated hot gas flow path for passage of combustion gas. The duct wall separates the hot gas flow path from an internal engine cavity, and the duct wall has at least one annular space. A rotor is rotatably mounted on an engine shaft for transferring energy from the combustion gas in the hot gas flow path to the engine shaft. The rotor extends from the internal engine cavity, through the annular space of the duct wall, and into the hot flow path. A contoured shroud is mounted within the internal engine cavity and defines a hot gas recirculation pocket for receiving hot gas ingested from the hot gas flow path through the annular space and for recirculating the ingested hot gas back through the annular space to the hot gas flow path. The contoured shroud includes a base wall extending radially inwardly from the duct wall, an inboard wall extending from the base wall in an axial direction toward the rotor, and an end wall extending from the inboard wall in a radially outward direction. The end wall terminates in a circumferentially extending free edge disposed in proximity to the annular space. The end wall defines an opening. The contoured shroud further includes a deflector at the opening that directs cooling air flow from the internal engine cavity into the hot gas recirculation pocket through the opening.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with improved hot gas recirculation pockets to reduce or eliminate hot gas ingestion. More particularly, the hot gas recirculation pockets provide for a quick and easy installation due to scallops or holes for bolt and bolt tool access. The term "bolt" can include rivets or other attachment mechanisms. Additionally, some exemplary embodiments include deflectors to manipulate airflow through the holes or scallops such that a desired temperature or flow field can be maintained.

Figure 1:
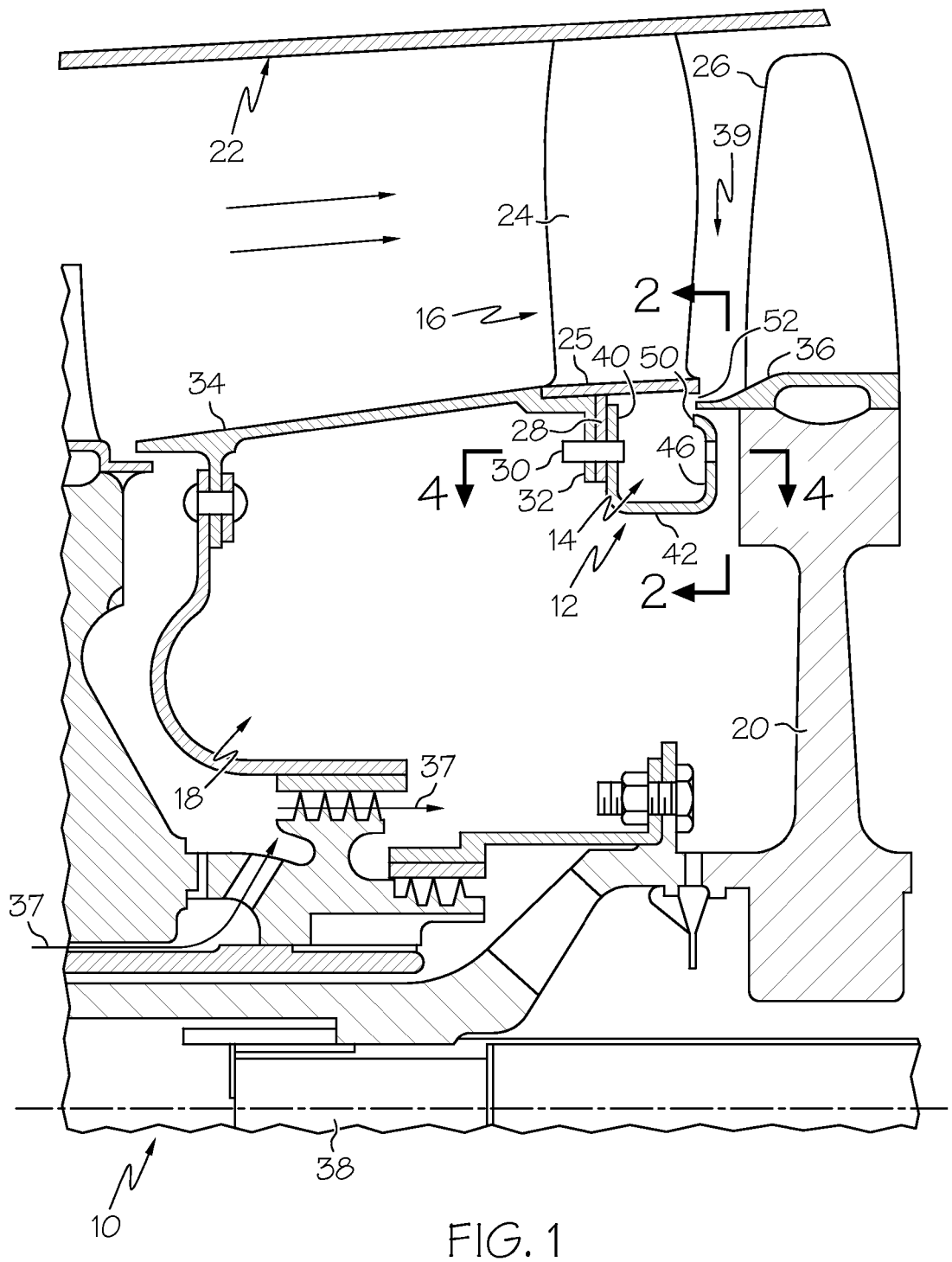
FIG. 1 is a fragmented vertical sectional view illustrating a portion of a gas turbine engine having a hot gas recirculation pocket formed in accordance with an exemplary embodiment.

FIG. 1 is a fragmented vertical sectional view illustrating a portion of a gas turbine engine 10 having a hot gas recirculation pocket 14 formed in accordance with an exemplary embodiment. The gas turbine engine 10 has an overall construction and operation which is generally known to and understood by persons skilled in the art. In general terms, the gas turbine engine 10 has a housing 22 with an annular duct wall 34 that defines a mainstream hot gas flow path 16 for receiving mainstream gas flow from an engine combustor (not shown). These mainstream heated engine gases 16 flow past axially spaced circumferential rows of stator vanes 24 and rotor blades 26 formed from suitable turbine blade materials capable of withstanding the high temperature environment within the mainstream hot gas flow path 16.

The stator vanes 24 project radially outwardly from a circumferential platform 25, with a connector flange 28 extending radially inwardly therefrom for convenient assembly by bolts 30 or the like to a mounting ring 32 forming a portion of the annular duct wall 34 which separates the outer mainstream hot gas flow path 16 from the internal engine cavity 18.

The rotor blades 26 project radially outwardly from a similar circumferential platform 36 which is adapted for appropriate connection to the rotor disk 20 at the periphery thereof. The rotor disk 20 is generally positioned within the internal engine cavity 18 and is appropriately coupled to a main engine shaft 38 for rotation therewith. Multiple rows of the stator vanes 24 and the rotor blades 26 may be provided in the gas turbine engine 10, with the rotor blades 26 and associated rotor disk 20 being rotatably driven by the hot gas flowing through the mainstream hot gas flow path 16. Each row of the rotor blades 26 projects into the mainstream hot gas flow path 16 through an annular space 39 in the duct wall 34 formed between adjacent rows of the stator vanes 24, with the rotor blade platform 36 being positioned within the space 39 at the inboard side of the mainstream hot gas flow path 16. A supply of cooling air obtained typically as a bleed flow for an engine compressor or compressor stage (not shown) is circulated into the internal engine cavity 18 as indicated by arrow 37 to cool engine components therein.

A portion of the mainstream hot gas flow path 16 may attempt to flow through the space 39 into the internal engine cavity 18, which includes components that may not be able to withstand the elevated temperatures of the mainstream hot gas flow path 16. FIG. 1 shows a hot gas recirculation pocket 14 at the upstream or high temperature side of the rotor disk 20. The hot gas recirculation pocket 14 captures and recirculates hot gas ingested from the mainstream hot gas flow path 16. The hot gas recirculation pocket 14 effectively minimizes or prevents undesirable high temperature exposure of engine components mounted within the cooled internal engine cavity 18, such as the turbine rotor disk 20. In this regard, other embodiments may include additional turbine rotor disks 20, also with additional hot gas recirculation pockets 14, at strategic locations for preventing hot gas ingestion from the mainstream hot gas flow path 16 into the internal engine cavity 18. In a typical application, a hot gas recirculation pocket 14 will be positioned at the high temperature side of the turbine rotor disk 20 disposed closest to the engine combustor, and thus subjected to the highest temperature gas. Multiple hot gas recirculation pockets 14 may be provided, for example, at the high temperature side of more than one rotor disk, or on opposite sides of one or more rotor disks.

As shown in FIG. 1, a contoured shroud 12 defines the hot gas recirculation pocket 14 and is constructed from one or more sheets of metal or the like. In one embodiment, the contoured shroud 12 is formed by a single piece of sheet metal. The hot gas recirculation pocket 14 generally includes a base wall 40 adapted for secure attachment to the duct wall 34 by bolts 30, typically at the time of stator vane installation. The base wall 40 projects radially inwardly at an axial position spaced upstream from the leading edge of the blade platform 36 associated with the adjacent rotor blades 26. The base wall 40 is typically formed integrally with an inboard wall 42 which protrudes axially toward the adjacent rotor disk 20. An end wall 46 extends radially outwardly from the inboard wall 42 in substantially parallel, close running clearance with the adjacent rotor disk 20, and terminates in a free edge 50 which closely underlies the upstream edge of the blade platform 36. In this embodiment, the end wall 46 is axially positioned with axial overlap relative to the blade platform 36, and the free edge 50 is defined by a curved lip extending a short distance back toward the base wall 40. In this embodiment, the free edge 50 terminates axially in the vicinity of the upstream edge of the blade platform 36.

The various walls 40, 42 and 46 defining the contoured shroud 12 cooperate with the duct wall 34 and/or stator vane platform 25 to define the hot gas recirculation pocket 14 of annular or toroidal-shape extending around the circumference of the internal engine cavity 18 in close proximity to the space between adjacent rows of stator vanes 24 and rotor blades 26. A narrow throat 52 for the hot gas recirculation pocket 14 is defined to accommodate the requisite running clearance between these components. In a typical engine, the radial dimension of this throat 52 is on the order of 0.04 inch.

In operation, pressure gradients which may occur along the mainstream hot gas flow path 16 can contribute to a somewhat unpredictable tendency for hot gas to be ingested from the mainstream hot gas flow path 16 into the internal engine cavity 18. In exemplary embodiments discussed herein, such ingested hot gas flows directly through throat 52 into the circumferential hot gas recirculation pocket 14 wherein the velocity thereof is reduced to substantially prevent further travel past the hot gas recirculation pocket 14 and into the internal engine cavity 18. Instead, the hot gas is captured within the hot gas recirculation pocket 14 where it tends to migrate circumferentially through the pocket to a region of lower pressure, for corresponding recirculation back to the mainstream hot gas flow path 16. The ingested hot gas is substantially isolated from the internal engine cavity 18 and the engine components therein, to achieve substantially improved overall temperature control.

Figure 2:
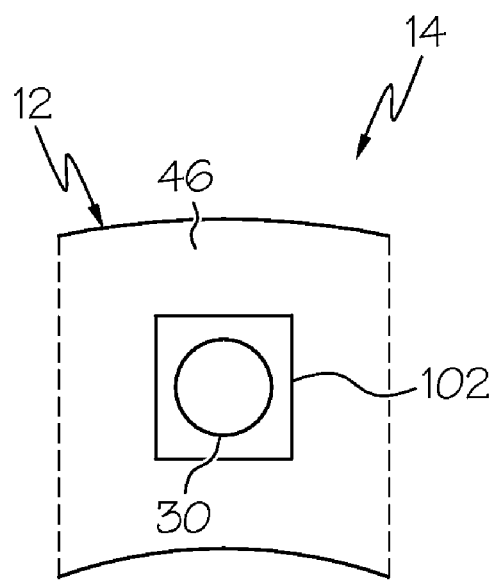
FIG. 2 is a side view of the hot gas recirculation pocket as viewed in the direction 2-2 of FIG. 1.

FIG. 2 is an aft view of the hot gas recirculation pocket 14 as viewed in the direction 2-2 of FIG. 1. FIG. 2 particularly shows a view of end wall 46 of contoured shroud 12. The end wall 46 includes an opening, which in this embodiment is a hole 102. The hole 102 enables access to the bolt 30 for installation or repair. The hole 102 may be defined as round, oval, elliptical, square, rectangular, or any shape suitable for bolt 30 access and for enhancing the aerodynamic or thermal performance of the contoured shroud 12. Any number of holes 102 can be provided, although the circumferential arrangement of holes 102 typically corresponds to the bolts 30. The access to the bolts 30 provided by the holes 102 enables the contoured shroud 12 have a single piece, integral construction that provides simpler and cheaper installation and repair. In alternate embodiments, the contoured shroud 12 can be machined from one or more pieces. As the rotor blades 26 (FIG. 1) rotate, areas of high pressure and low pressure are created in the mainstream hot gas flow path 16. Generally, the high pressure areas are located in the wake regions of the trailing edges of the stator vanes 24, and low pressure areas are located between the stator vanes 24. In one embodiment, the holes 102 and bolts 30 are positioned to be in areas of low pressure. Computational fluid dynamic (CFD) analysis can additionally be used optimize the location of the holes 102.

Figure 3:
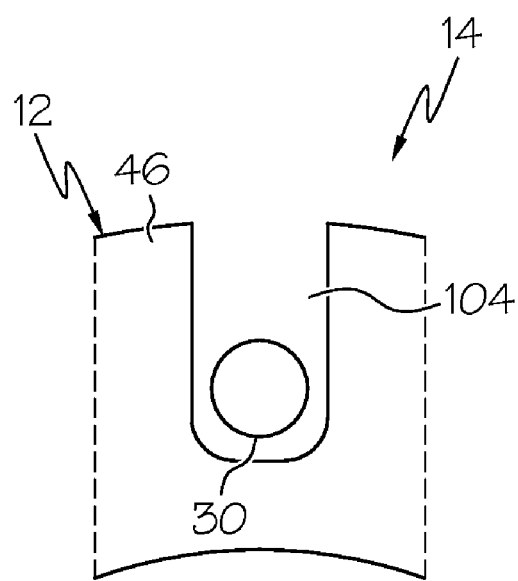
FIG. 3 is an alternate side view of the hot gas recirculation pocket as viewed in the direction 2-2 of FIG. 1.

FIG. 3 is an alternate side view of the hot gas recirculation pocket as viewed in the direction 2-2 of FIG. 1. In contrast to the holes 102 of FIG. 2, the embodiment of FIG. 3 includes a scallop 104 formed in the end wall 46 of the contoured shroud 12 that defines the hot gas recirculation pocket 14. The scallop 104 enables access to the bolt 30 for installation or repair. This enables the contoured shroud 12 to be formed with an integral construction. Additionally, the scallop 104 extends to the free edge 50 of the contoured shroud 12. The contoured shroud 12 forming the hot gas recirculation pocket 14 may be subject to large thermal gradients that tend to result in the free edge 50 bowing outwardly towards the downstream rotor disk 20. The scallop 104 may accommodate any thermal stresses and prevent or reduce thermal bowing of the free edge 50.

Figure 4:
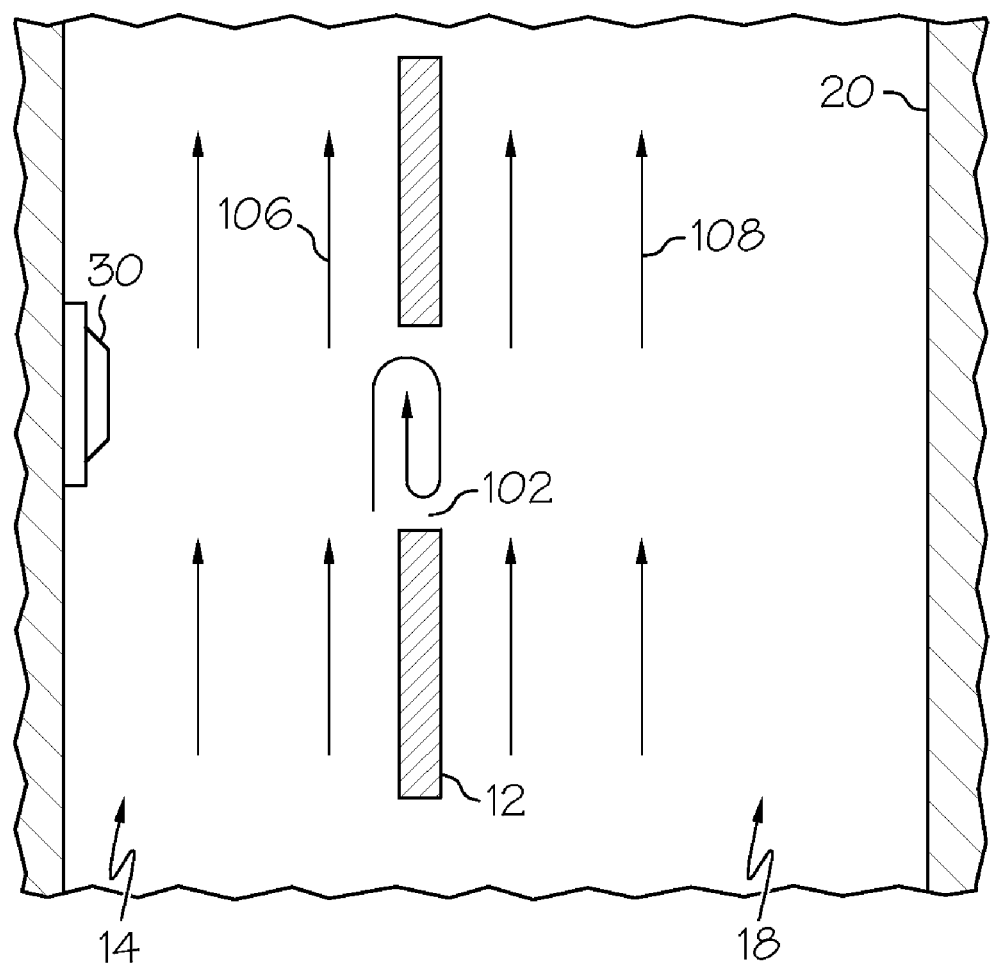
FIG. 4 is a partial, top cross-sectional view of the gas turbine engine of FIG. 1 through line 4-4.

FIG. 4 is a partial, top cross-sectional view of the gas turbine engine 10 of FIG. 1 through line 4-4. FIG. 4 more clearly shows the opening in the contoured shroud 12, in this case the hole 102, in relation to the hot gas recirculation pocket 14 and the rotor disk 20. In the depicted position, hot ingested flow 106 within the hot gas recirculation pocket 14 generally moves in a parallel direction to the circumferential component of the velocity of the cooling flow 108 within the internal engine cavity 18. In this exemplary embodiment, computational fluid dynamic (CFD) analysis confirms that very little of the hot ingested flow 106 migrates out of the hot gas recirculation pocket 14 to reach the internal engine cavity 18. Accordingly, the holes 102 within the contoured shroud 12 enable access to the bolt 30 without adversely affecting the effectiveness of the hot gas recirculation pocket 14.

Figure 5:
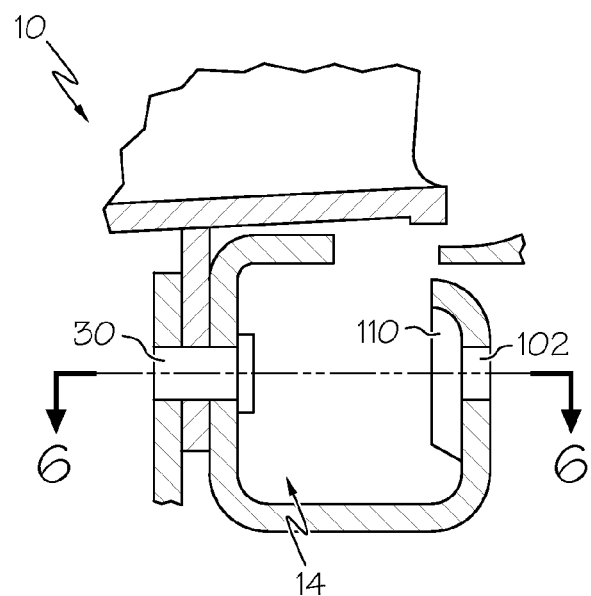
FIG. 5 is a fragmented vertical sectional view illustrating a portion of a gas turbine engine having a hot gas recirculation pocket formed in accordance with an alternate exemplary embodiment.
Figure 6:
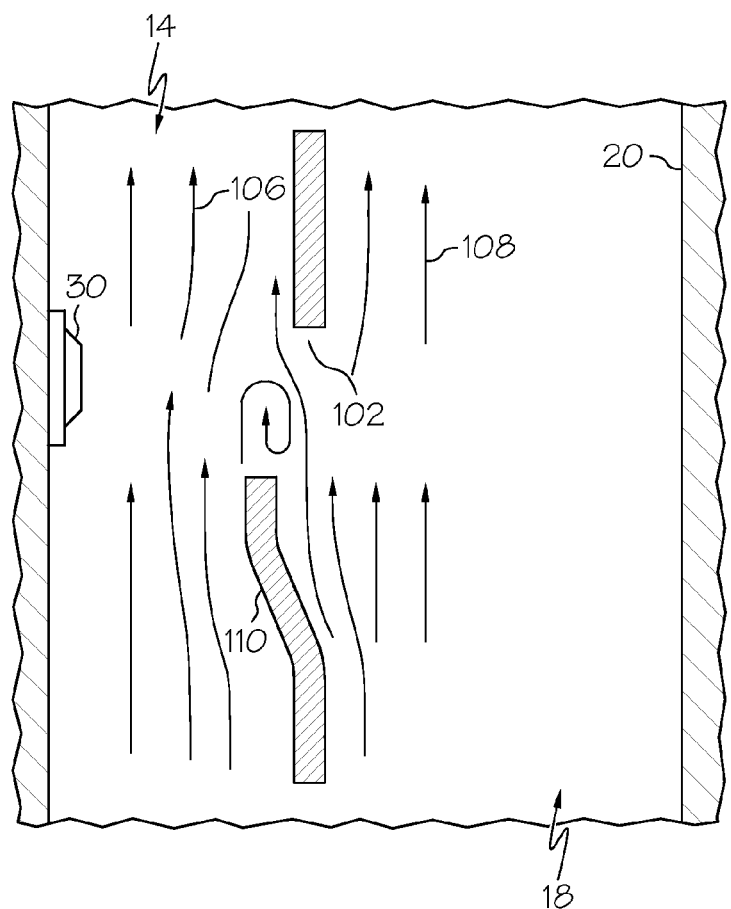
FIG. 6 is a partial, top cross-sectional view of the gas turbine engine of FIG. 5 through line 6-6.

FIGS. 5 and 6 illustrate an alternate exemplary embodiment of the hot gas recirculation pocket 14. FIG. 5 is a fragmented vertical sectional view, and FIG. 6 is a partial, top cross-sectional top view of the gas turbine engine 10 of FIG. 5 through line 6-6. As best shown in FIG. 6, the hole 102 includes a deflector 110 on an upstream side of the hole 102 that extends forward into the hot gas recirculation pocket 14. This configuration results in a portion of cooling flow 108 flowing through hole 102 into the hot gas recirculation pocket 14. A similar phenomenon could result in a further alternate exemplary embodiment by extending a deflector on a downstream side of the hole outwardly, i.e., aft out of the hot gas recirculation pocket 14 such that cooling flow is directed into the hot gas recirculation pocket.

Figure 7:
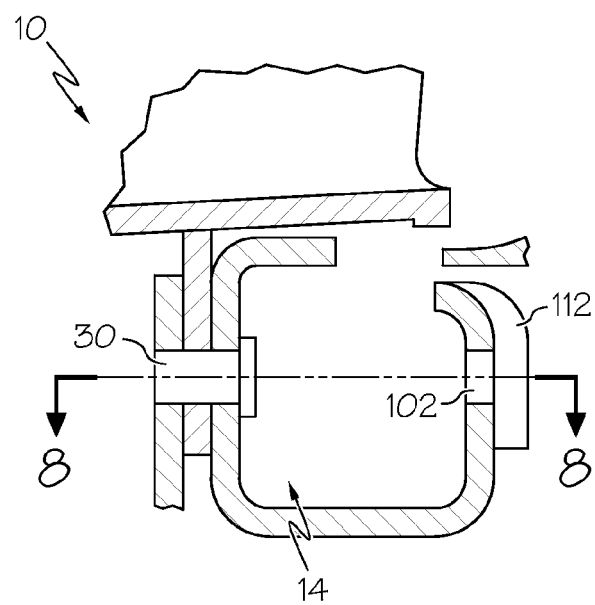
FIG. 7 is a fragmented vertical sectional view illustrating a portion of a gas turbine engine having a hot gas recirculation pocket formed in accordance with yet another alternate exemplary embodiment.
Figure 8:
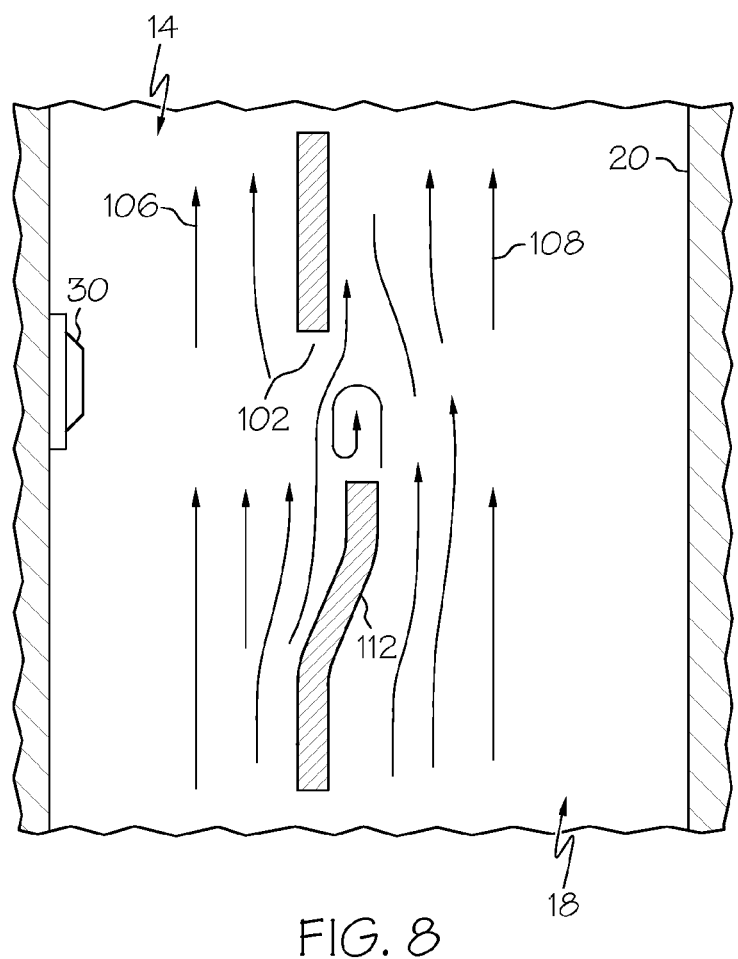
FIG. 8 is a partial, top cross-sectional view of the gas turbine engine of FIG. 7 through line 8-8.

FIGS. 7 and 8 illustrate another alternate exemplary embodiment of the hot gas recirculation pocket 14. FIG. 7 is a fragmented vertical sectional view, and FIG. 8 is a partial, top cross-sectional top view of the gas turbine engine 10 of FIG. 7 through line 8-8. As best shown in FIG. 8, the hole 102 includes a deflector 112 on an upstream side of the hole 102 that extends aft away from the hot gas recirculation pocket 14 and toward the rotor disk 20. This configuration results in a portion of ingested flow 106 flowing through hole 102 into the cooler internal engine cavity 18. There are circumstances in which it is desirable to increase the temperature of the internal engine cavity 18. A similar phenomenon could result in a further alternate exemplary embodiment by extending a deflector on a downstream side of the hole inwardly, i.e., forward into the hot gas recirculation pocket such that ingested flow migrates out of the hot gas recirculation pocket into the internal engine cavity 18. Embodiments such as those shown in FIGS. 5-8 illustrate that the hot gas recirculation pocket 14 can be manipulated to increase or decrease the temperature of the ingested flow 106 and/or the cooling flow 108.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:
a housing including a duct wall and defining a generally annular and axially elongated hot gas flow path for passage of combustion gas, the duct wall separating the hot gas flow path from an internal engine cavity, the duct wall having at least one annular space;
a rotor rotatably mounted on an engine shaft for transferring energy from the combustion gas in the hot gas flow path to the engine shaft, the rotor extending from the internal engine cavity, through the annular space of the duct wall, and into the hot flow path;
a contoured shroud mounted within the internal engine cavity and defining a hot gas recirculation pocket for receiving hot gas ingested from the hot gas flow path through the annular space and for recirculating the ingested hot gas back through the annular space to the hot gas flow path, the contoured shroud comprising a base wall extending radially inwardly from the duct wall, an inboard wall extending from the base wall in an axial direction toward the rotor, and an end wall extending from the inboard wall in a radially outward direction, the end wall terminating in a circumferentially extending free edge disposed in proximity to the annular space, the end wall defining an opening.

2. The gas turbine engine of claim 1, wherein the base wall, the inboard wall, and the end wall are integrally formed with one another.

3. The gas turbine engine of claim 1, wherein the contoured shroud is mounted within the internal cavity with a bolt, the opening having a size sufficient to allow installation access to the bolt.

4. The gas turbine engine of claim 1, wherein the opening is a hole at a distance from the free edge.

5. The gas turbine engine of claim 1, wherein the opening is a scallop formed at the free edge.

6. The gas turbine engine of claim 5, wherein the scallop is configured to relieve thermal stress in the contoured shroud.

7. The gas turbine engine of claim 1, wherein contoured shroud further includes a deflector at the opening.

8. The gas turbine engine of claim 7, wherein the internal engine cavity is provided with a cooling air flow.

9. The gas turbine engine of claim 8, wherein the deflector directs the cooling air flow into the hot gas recirculation pocket through the opening.

10. The gas turbine engine of claim 7, wherein the deflector is positioned on an upstream edge of the opening and projects into the hot gas recirculation pocket.

11. The gas turbine engine of claim 7, wherein the deflector deflects the combustion gases out of the hot gas recirculation pocket.

12. The gas turbine engine of claim 11, wherein the deflector is positioned on an upstream edge of the opening and projects into the internal engine cavity.

13. The gas turbine engine of claim 1, wherein the combustion gas has areas of high pressure and low pressure, and wherein the opening corresponds to one of the areas of low pressure.

14. A gas turbine, comprising:
a housing including a duct wall and defining a generally annular and axially elongated hot gas flow path for passage of combustion gas, the duct wall separating the hot gas flow path from an internal engine cavity, the duct wall having at least one annular space;
a circumferentially extending row of stator vanes mounted on the housing within the hot gas flow path at a position generally at the upstream side of the annular space in the duct wall relative to the direction of combustion gas flow through the hot gas flow path;
a turbine rotor including a rotor disk rotatably supported within the internal engine cavity with a periphery of the rotor disk disposed generally within the annular space formed in the duct wall, and a plurality of rotor blades on the disk periphery and disposed generally within the hot gas flow path; and
a contoured shroud mounted within the internal engine cavity in close running clearance with the rotor disk at the disk periphery, the shroud defining a radially outwardly open and circumferentially extending hot gas recirculation pocket for receiving hot gas ingested from the hot gas flow path through the annular space and for recirculating the ingested hot gas back through the annular space to the hot gas flow path, the contoured shroud additionally defining an attachment access opening.

15. The gas turbine of claim 14, wherein the contoured shroud includes a base wall extending radially inwardly from the duct wall, an inboard wall extending from the base wall in an axial direction toward the rotor disk, and an end wall extending from the inboard wall in a radially outward direction and in close running clearance with the rotor disk, the end wall terminating in a circumferentially extending free edge disposed in close proximity to the annular space in the duct wall, the end wall defining the attachment access opening.

16. The gas turbine of claim 15, wherein the base wall, the inboard wall, and the end wall are integrally formed with one another.

17. The gas turbine of claim 15, wherein the attachment access opening is a hole at a distance from the free edge.

18. The gas turbine of claim 15, wherein the attachment access opening is a scallop formed at the free edge.

19. The gas turbine of claim 14, wherein contoured shroud further includes a deflector at the annular space.

20. A gas turbine engine, comprising:
a housing including a duct wall and defining a generally annular and axially elongated hot gas flow path for passage of combustion gas, the duct wall separating the hot gas flow path from an internal engine cavity, the duct wall having at least one annular space;
a rotor rotatably mounted on an engine shaft for transferring energy from the combustion gas in the hot gas flow path to the engine shaft, the rotor extending from the internal engine cavity, through the annular space of the duct wall, and into the hot flow path;
a contoured shroud mounted within the internal engine cavity and defining a hot gas recirculation pocket for receiving hot gas ingested from the hot gas flow path through the annular space and for recirculating the ingested hot gas back through the annular space to the hot gas flow path, the contoured shroud comprising a base wall extending radially inwardly from the duct wall, an inboard wall extending from the base wall in an axial direction toward the rotor, and an end wall extending from the inboard wall in a radially outward direction, the end wall terminating in a circumferentially extending free edge disposed in proximity to the annular space, the end wall defining an opening, the contoured shroud further including a deflector at the opening that directs cooling air flow from the internal engine cavity into the hot gas recirculation pocket through the opening.

* * * * *